United States Patent

[11] 3,627,199

| [72] | Inventor | Robert R. Hill |
| | | Westlake, Ohio |
| [21] | Appl. No. | 38,135 |
| [22] | Filed | May 18, 1970 |
| [45] | Patented | Dec. 14, 1971 |
| [73] | Assignee | Lee Wilson Engineering Company, Inc. |
| | | Cleveland, Ohio |
| | | Continuation-in-part of application Ser. No. 9,896, Feb. 9, 1970, now abandoned, which is a continuation-in-part of application Ser. No. 764,192, Oct. 1, 1968, now abandoned. This application May 18, 1970, Ser. No. 38,135 |

[54] ANNEALING TIME CALCULATOR
21 Claims, 8 Drawing Figs.

[52] U.S. Cl. .................................................. 235/85,
235/69
[51] Int. Cl. ..................................................... G06c 3/00,
G06c 27/00
[50] Field of Search ........................................... 235/85, 69, 89

[56] References Cited
UNITED STATES PATENTS

| 1,686,843 | 10/1928 | Burke.......................... | 235/85 R |
| 2,380,318 | 7/1945 | Kline........................... | 235/85 R |
| 3,502,264 | 3/1970 | Borseth........................ | 235/69 |
| 3,533,551 | 10/1970 | Cole et al..................... | 235/89 R |

Primary Examiner—Stephen J. Tomsky
Attorney—Bosworth, Sessions, Herstrom & Cain

ABSTRACT: A calculator for determining the minimum length of time to operate an annealing furnace, such as a hood or bell-type, to anneal a charge of coils of strip metal, some of which may have different sizes or weights, wherein a plurality of interrelated slide rule type scales cooperate to determine and indicate the minimum annealing time sought.

Optionally, the calculator may have other scales, such as a scale to account for the difference between the temperature to be reached at the center of the coils and the temperature of the surrounding heating medium; or a scale to compensate for difference in types or efficiencies of furnaces, types of steel, and the like.

INVENTOR.
ROBERT R. HILL
BY Bosworth, Sessions,
Herstrom & Cain
ATTORNEYS

3,627,199

ANNEALING TIME CALCULATOR

CROSS-REFERENCE TO RELATED APPLICATIONS

This is a continuation-in-part of an application filed Feb. 9, 1970, Ser. No. 9896, which was, in turn, a continuation-in-part of an application filed Oct. 1, 1968, Ser. No. 764,192, now abandoned. Both prior parent applications were in the name of Robert R. Hill and entitled "Method of Establishing Minimum Coil Annealing Time for Maximum Production."

BACKGROUND OF THE INVENTION

Hood or bell-type furnaces are in extensive use for annealing or otherwise heat-treating steel, copper, copper-alloys, aluminum, and the like. As used here and in the claims, the terms "anneal" and "annealing" extend to and include any treatment involving heating of a charge which may be carried out in a furnace.

The use of a bell-type furnace embodies a batch operation, and a considerable period of time is required to raise the temperature of the charge to the desired point. Various means have been employed to shorten the annealing cycle, such as rapid circulation of heated atmosphere over the charge and, in the case of annealing strip in coils, the use of convectors or spacers between stacked coils to permit the passage of heated gas over and the absorption of heat through the edges of the coil laps, that is, axially instead of radially.

In spite of such improvements, a problem remains in that, given a predetermined desired annealing temperature, it has previously been difficult to estimate accurately how long an annealing furnace should be operated in order that literally every portion of every coil in a furnace charge reaches this temperature but the last part of the charge to reach it is not heated substantially higher than such temperature. Since plant production schedules rarely if ever permit all coils of a furnace charge to be of the same size and/or weight, the problem is peculiarly accentuated in that coils differing in widths, diameters, or weight usually make up each charge to be annealed in a furnace.

Operators of furnaces today are guided almost wholly by past experience in determining annealing cycles and rely on rules of thumb which, again, are based on previous experience. In almost all cases the operators, to be on the safe side, allow more than enough time to reach annealing temperature in all parts of the charge and employ soak or holding times which are more than sufficient properly to anneal the coils.

Particularly when the coils being annealed are of random widths, diameters, and weights, it is clear that under prior practice at least some of the strip in a charge will be overannealed. Such overannealing does not harm the steel as long as excessively high temperatures are not reached but such overannealing obviously wastes production time of the annealing equipment as well as requiring more fuel than is necessary to do the job.

It is, therefore, a primary object of this invention to provide means for determining an annealing cycle whereby all of the coils in a charge will be properly annealed, even though the charge is made up of coils of different widths, diameters, and/or weights, and the most difficult to anneal coil will not be materially overannealed.

SUMMARY OF THE INVENTION

The present calculator establishes the minimum length of time required acceptably to anneal, under predetermined conditions, a charge of coils, even though the coils may individually differ from one another in size or weight. In accordance with the present invention, the minimum length of time to operate an annealing furnace for a charge of coils is determined by establishing a size factor, derived from one scale of the calculator in a manner to be later described, for a coil of the charge based only on its dimensional width and its mass or weight. When, as is almost invariably the case, the coils of a charge are not identical in size and weight, such a size factor is similarly determined for each coil. A second factor, hereinafter referred to as the weight factor, is also derived from another scale of the calculator as later described. This weight factor is based only on the weight of the entire charge, the comparative sizes of the coils here being immaterial, and the minimum annealing temperature to be reached throughout the charge.

These factors are based on prior histories of annealing operations for the general type of furnace in which the annealing operations are to be carried out. In the above noted parent applications, Ser. No. 764,192, and Ser. No. 9896 the numerical values for each factors are derived from families of curves graphically illustrating a correlation between the values mentioned, that is, a correlation between the coil width and coil weight for the size factor; and a correlation between the total weight of the charge and the minimum annealing temperature for the weight factor. The manner in which such families of curves (FIGS. 2 and 3 of the prior applications) are derived is described in parent application, Ser. No. 9896. In the present invention, these numerical factors and their related data are embodied in the several scales of the calculator, including a scale correlating the highest size factor (where the coils of a charge are of different sizes and/or weights), the weight factor, and the total weight of the charge to indicate the minimum time period required for the desired annealing of the given charge.

Additional scales are also provided which may be used to account for any temperature differential between the highest temperature to be attained by a coil during the annealing operation and the temperature of the heating medium in which the coils are immersed. A further scale may be used to account for performance characteristics of a furnace or type of metal in the coil in comparison with a furnace or type of metal taken as standards.

DESCRIPTION OF THE PREFERRED EMBODIMENT

Figure 1:
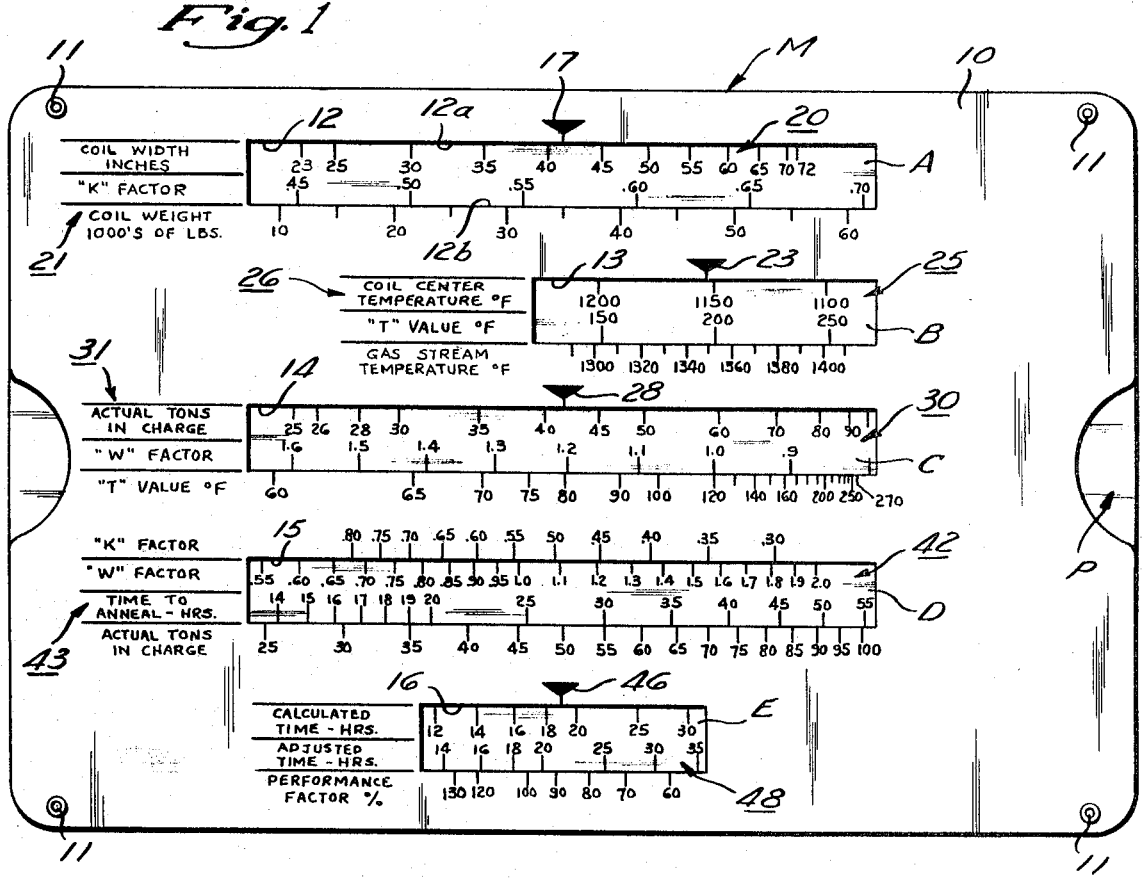
FIG. 1 is a front elevation of a calculator embodying the present invention.

There are many variables within a furnace, often working in competition with each other, which affect the annealing of coils. The principal variables are:
1. Coil weight
2. Coil width
b 3. Charge weight
4. Furnace control temperature
5. Work control temperature
6. "Soak" or holding period In order to develop a process for determining the minimum annealing time for maximum production in a coil annealing furnace, the effects of preferably all of these six operational factors should be accounted for. In parent application Ser. No. 764,192, and its continuation-in-part application Ser. No. 9896 these operational factors are reduced to two numerical factors. To derive one numerical factor, a family of curves is plotted, based on prior histories of annealing operations in a given type of furnace, for varying coil widths and varying coil weights to provide a factor designated as a size factor. To derive another numerical factor, a family of curves is plotted, based on prior histories of annealing operations for the same type of furnace, for varying weights of a total charge and varying annealing temperatures to provide a factor designated as a weight factor. The minimum operating time for annealing the entire charge in such a furnace is then calculated by the formula:

$$S_m \times W \times C = H$$

wherein $S$ is the size factor for a coil, $S_m$ being the largest individual size factor of all of the coils in the charge; $W$ is the weight factor; $C$ is the total weight of the charge; and $H$ is the minimum annealing period. The values of these factors are normally in the English system, but it will be understood that metric values could be used. The calculated result is the minimum time required to heat to a selected temperature the center-center of the coil most difficult to anneal of those in the charge.

In the present invention, the calculator utilizes basically the same variables as are discussed in the parent applications, Ser. No. 764,192 and Ser. No. 9896, but converts their expression and manner of use to a plurality of inter-related scales, such as are shown in FIG. 1.

Structurally, in one form of the invention, the calculator comprises a body member M in the form of a sleeve and a unitary slide panel P telescopically mounted within the member M for relative longitudinal movement. The body member M comprises two sheets 10 of cardboard, plastic, or the like, mounted back-to-back (of which only the front is shown) and riveted together at each of the four corners as at 11. The two sheets form the sleeve and receive the slide panel P therebetween in guided, sliding relation.

Frontal sheet 10 of the body member M has a series of five generally rectangular openings indicated in FIG. 1 by reference characters 12 through 16. The longer edge portions of the openings 12 through 16 carry suitable indicia as hereinafter described. Similarly, the slide panel P carries indicia for registry with those of each of the edge portions of the five openings. For convenience of reference, the scales resulting from the cooperating rectangular openings 12 through 16 and the indicia of the slide panel P which appear in the openings are jointly hereinafter referred to as scales A, B, C, D, or E, as shown in FIG. 1.

As the width of a coil increases, it takes longer to heat. In addition, the mass or weight of each coil has a direct effect on the time necessary to bring the entire coil to a desired temperature. To minimize variables 1 and 2 above referred to (coil weight and coil width) the approach of the present invention is to classify coils according to their relative ease or difficulty in transferring heat from the outer surface of the coils to the "coldest" or most inaccessible point within the coil, sometimes referred to in the art as the center-center of the coil. To account for variables 1 and 2, a size factor is derived which is based only on the width of the coil and its weight. These size factors are graphically illustrated, for example in FIG. 2 of parent application, Ser. No. 764,192, as well as in FIG. 2 of parent application, Ser. No. 9896 wherein a family of curves enables a user to establish a size factor, based on variables 1 and 2, for coils to be annealed. It is emphasized that this size factor accounts for the coils individually regardless of the diameters of the coils which need not even be measured in the practice of the present invention.

Figure 2:
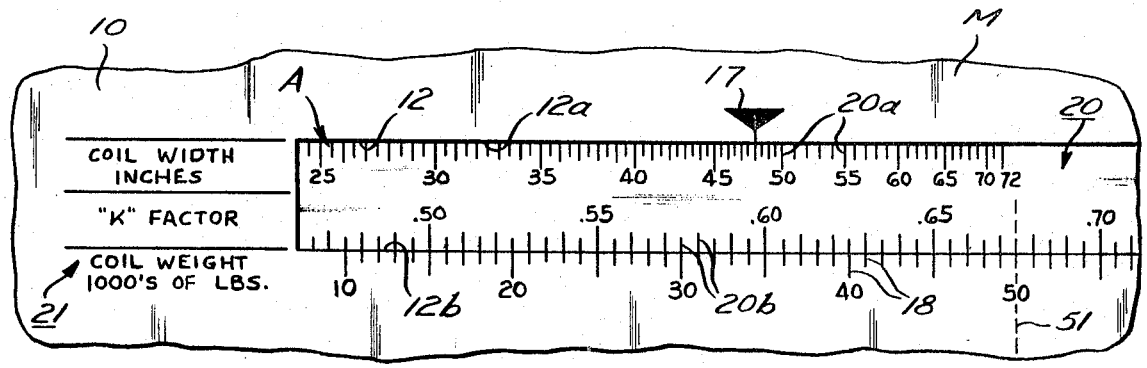
FIGS. 2 through 6 are enlarged, fragmentary views of each of the scales of the calculator of FIG. 1, given in the order in which the scales appear in that figure, and in which each scale is set at a particular value for a working example hereinafter described.

In the present calculator, scale A is designed to provide a size factor, indicated in FIGS. 1 and 2 for convenience as the "K" factor. More particularly, the opening or window 12 of scale A has spaced apart edge portions 12a and 12b, the upper of which has fixed pointing means in the form of an arrowhead 17, and the lower of which has indicia 18 (see FIG. 2) of weight values for individual coils of a charge expressed in thousands of pounds. Slide section 20 of slide panel P has spaced apart line portions of indicia 20a and 20b (see FIG. 2) relatively movable along the opposed edge portions 12a and 12b for selected registry therewith. The indicia of the upper line portion 20a have coil width values expressed in inches and cooperate with the arrowhead 17. The indicia of the lower line portion 20b of scale A have values representing size ("K") factors and cooperate with edge portion 12b of opening 12.

Sheet 10 bears suitable explanatory legend, generally indicated at 21, directly to the left of scale A in horizontal alignment with the indicia to which each portion of the legend pertains.

On scale A, the weight value indicia 18 of the edge portion 12b of opening 12 as well as the coil width indicia 20a and the size factor indicia 20b of the line portions of slide section 20 all have their indicated values increasing in magnitude in the same direction with respect to such scales, namely, to the right as viewed in FIGS. 1 and 2. The units of indicia 12b and the units of indicia 20b are uniformly spaced, but the units of indicia 20a decrease in linear spacing in the direction of increasing magnitude. The decrease in spacing is based on prior operating annealing experience with the type of furnace in question, for example, as from the family of curves of FIG. 2 in the parent application, Ser. No. 764,192, and its continuation-in-part, Ser. No. 9896. In this manner, registry of a selected coil width from indicia 20a opposite the arrowhead 17 indicates a size "K" factor (called the "S" factor in said prior applications) from indicia 20b opposite a selected coil weight from indicia 18.

To assist in accurate establishment of minimum annealing times for charges in coils of strip in a furnace, it is desirable to reduce substantially, or eliminate, the effects of variables 4, 5 and 6, noted above, on the annealing time. This may be accomplished by control of the temperature of the circulating heated gas stream by a control thermocouple which is placed in such location in the stream that the effect of the radiant heat from the combustion tubes, or other heat source, is instantly detected by the thermocouple. The heat source is responsive to the thermocouple so that a known constant temperature is maintained in the convection gases or other heating medium.

Such heating medium temperature control permits the annealing operator accurately to control the outer wrap temperature of the coil so as to eliminate or minimize grain enlargement. Maintaining the heating medium at a given temperature throughout the heating cycle protects the coils on the outside against harmful overheating while creating a maximum heat head potential for heating the coil interiors. This brings the center-centers of the coils to temperature faster than if the heat input is gradually reduced as in the case when controlling the temperature by a thermocouple disposed at the bottom center of the bottom coil of the charge as has previously been the common practice.

There is normally a lag in the coil temperature as compared to that of the heating medium so that normally the coil temperature never quite reaches that of the heating medium. It is possible to allow for such a differential between the temperatures of the heating medium and the coils. For example, if a annealing temperature of 1,250° F. is contemplated and a temperature differential of 15° F. is expected, the temperature of the heating medium is controlled at 1,265° F.

Scale B (FIGS. 1 and 3) takes into account the difference between the coil center-center temperature which is to be reached and the temperature of the heating medium. More particularly, scale B is designed to provide a differential resulting from known preselected temperature operating conditions. The opening 13 of scale B has spaced apart edge portions 13a and 13b, the upper of which has a fixed arrowhead 23 and the lower of which has indicia 24 of temperature values for a heating medium, such as gas stream temperatures, expressed in degrees Fahrenheit. Slide section 25 of slide panel P has spaced apart line portions of indicia 25a and 25b that are relatively movable along the opposed edge portions 13a and 13b for selected registry therewith.

The indicia of the upper line portion 25a have temperatures of the coil center-centers expressed in degrees Fahrenheit and cooperate with the arrowhead 23. The indicia 25b of the lower line portion of scale B have temperature values (identified as "T" values) representing a differential between the coil center-center temperature and the temperature of the heating medium and cooperate with edge portion 13b of opening 13.

Suitable explanatory legends, generally indicated at 26, appear on sheet 10 to the left of scale B in line with the indicia to which each portion of the legend pertains.

On Scale B, the gas stream temperature indicia 24 and the "T" value indicia 25b have their values increasing in magnitude in the same direction with respect to such scales, that is, to the right. But the coil temperature indicia 25a decrease in magnitude in the same direction. The units of indicia 24, indicia 25a, and indicia 25b are all uniformly spaced along their respective scales. In this manner, registry of a selected coil center temperature from indicia 25a opposite the arrowhead 23 indicates a value designated as a "T" value in degrees Fahrenheit from indicia 25b opposite a selected gas stream temperature from indicia 24.

Knowing the differential, if any, between the desired coil center temperature and that of the surrounding heating medium, a user of the calculator may proceed to a consideration of the total weight of the charge. The total weight of a coil charge materially affects the annealing time. To take into account variable 3 of the above list, weight factors are derived based on the weight of the entire charge and the annealing temperature which is to be used. In the cited parent applications, these weight factors are graphically illustrated in FIG. 3, wherein a family of curves enables the user to establish a weight factor for charges to be annealed.

Figure 4:
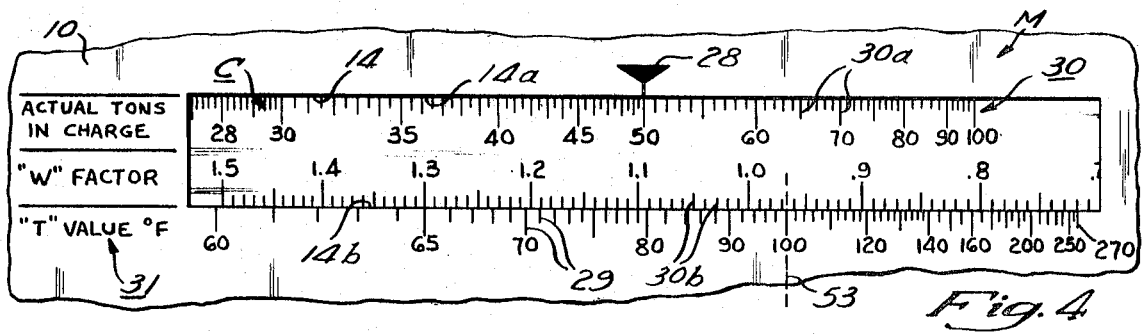

In the present calculator, scale C is designed to provide a weight factor, indicated in FIGS. 1 and 4 for convenience as the "W" factor. The temperature values of scale C cover the range from commercial quality to extra deep drawing quality for steel strip. If desired, separate graphs of data for deriving the weight factor can be constructed for annealing other types of metal, for example, tin plate.

More particularly, the opening or window 14 of scale C has spaced apart edge portions 14a and 14b. The upper portion 14a has a fixed arrowhead 28, and the lower portion 14b has indicia 29 of "T" differential temperature values, which may be derived from a scale like scale B of FIG. 3, expressed in degrees Fahrenheit. Slide section 30 of slide panel P has spaced apart line portions of indicia 30a and 30b relatively movable along the opposed edge portions 14a and 14b for selected registry therewith. The indicia of the upper line portion 30a have weight values of the entire charge expressed in tons and cooperate with the arrowhead 28. The indicia of the lower line portion 30b have values representing weight factors, indicated as "W" factor, and cooperate with edge portion 14b of opening 14. As with the other scales, sheet 10 bears suitable explanatory legend, generally indicated at 31, directly to the left of scale C and in line with indicia to which each portion of the legend pertains.

On scale C, the differential "T" value indicia 29 of the edge portion 14b and the total charge weight indicia 30a of slide section 30 have their indicated values increasing in magnitude in the same direction with respect to the scales, namely, to the right as viewed in the figures. However, the indicia 30b for the "W" factors decrease in magnitude in that direction. The units of all the indicia, that is, indicia 29, 30a and 30b, decrease in linear spacing in the direction of increasing magnitudes. The decrease in spacing is based on prior operating experience with the type of furnace in question, for example, as from the family of curves of FIG. 3 in the cited parent applications. In this manner, registry of a selected total weight of a charge in tons from indicia 14a opposite the arrowhead 28 indicates a weight factor "W" from indicia 30b opposite a "T" value selected from indicia 29.

Figure 7:
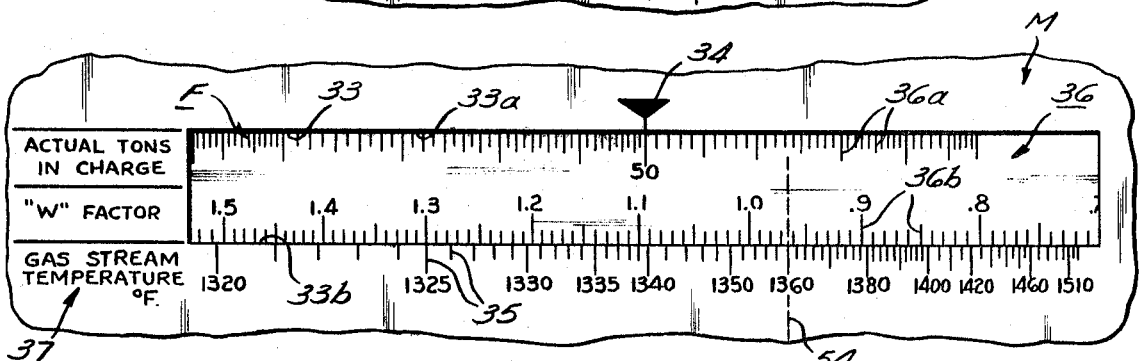
FIG. 7 is an enlarged, fragmentary view of a modified scale which may be used in place of the scales of FIGS. 3 and 4.

If the differential between the temperature of the coil centers and that of the temperature of the heating medium is fairly constant for all annealing runs contemplated, or if the temperature differential for a particular run is already known so as to be readily taken into account, a scale F, such as is shown in FIG. 7 but not included in the calculator of FIG. 1, may be directly used in place of combined scales B and C. Basically, scale F corresponds to scale C except that the bottom line of indicia reads directly in temperature in degrees Fahrenheit of the heating medium instead of corresponding to the differentials ("T" values) between the annealing and heating medium temperatures.

The structure of scale F is similar to the other scales. It could, for example, form part of the body member M and have a rectangular window 33 (see FIG. 7) provided with spaced apart edge portions 33a and 33b. The upper edge portion has fixed pointing means in the form of an arrowhead 34, and the lower edge portion has indicia 35 of gas stream temperatures expressed in degrees Fahrenheit. A slide section 36 of slide panel P has spaced apart line portions of indicia 36a and 36b relatively movable along the opposed edge portions 33a and 33b for selected registry therewith. The indicia of the upper line portion 36a have total charge weight values expressed in tons, like indicia 14a of scale C of FIG. 4, and cooperate with the arrowhead 34. Indicia of the lower line portion 36b of scale F have values representing weight factors "W," like the indicia 30b of scale C of FIG. 4, and cooperate with edge portion 33b of opening 33. Scale F may also have suitable explanatory legend, generally indicated at 37, placed in line with the indicia to which each portion of the legend pertains.

The gas stream temperature indicia 35 of the edge portion 33b and the total charge weight indicia 36a of slide section 36 have their values increasing in magnitude in the same direction, namely, to the right as viewed in FIG. 7. However, the indicia 36b for the weight factors decrease in magnitude in that direction. The units of all the indicia, that is, indicia 35, 36a and 36b, decrease in linear spacing in the direction of increasing magnitude. As before, the decrease in spacing is based on prior operating experience, such as with the type of furnace in question. In this manner, registry of a selected total weight of charge from indicia 36a opposite the arrowhead 34 indicates directly a weight factor "W" from indicia 36b opposite a temperature of the heating medium selected from indicia 35.

Having determined a weight factor "W" and a size factor "K" from prior scales, and knowing the total weight of the charge, it is now possible by the use of scale D (FIGS. 1 and 5) to determine the unknown sought, namely, the minimum length of time to operate the furnace in question in order suitably to anneal all coils in the charge, even though the coils may differ in size and/or weight.

The opening 39 for scale D in sheet 10 of the body member M has spaced apart edge portions 39a and 39b. The upper edge portion 39a has indicia 40 expressing size or "K" factors, while the lower edge portion has indicia 41 representing the total weight of the charge expressed in tons. Slide section 42 of slide panel P has spaced-apart line portions of indicia 42a and 42b relatively movable along the opposed edge portions 39a and 39b for selected registry therewith. The indicia of the upper line portion 42a represent the "W" or weight factors and cooperate with the indicia 40 of the edge portion 39a which represent the "K" or size factors. Indicia 42b of the lower line portion of slide section 42 have time values expressed in hours and cooperate with the indicia 41 of the edge portion 39b. Suitable explanatory legends, generally indicated at 43, are also preferably present in line with the various indicia to which each pertains.

Figure 5:
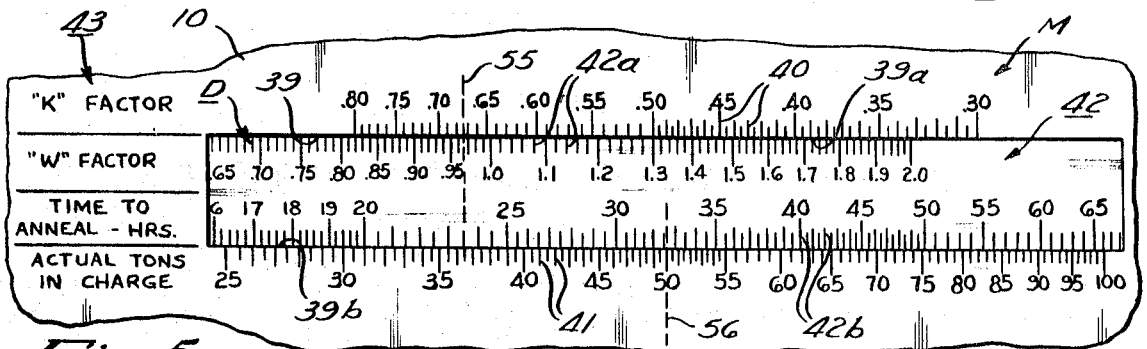

On scale D, the total charge weight indicia 41, the "W" factor indicia 42a, and the time value indicia 42b, all have their indicated values increasing in magnitude in the same direction, that is, to the right as viewed in FIGS. 1 and 5. The "K" factor indicia 40 decreased in magnitude in the same direction. The units of all the indicia on scale D, that is, indicia 40, 41, 42a and 42b, decrease in linear spacing in the direction of increasing magnitudes. Such decreases in spacing are based, as before, on prior operating experience with the type of furnace in question. In this manner, registry of a "W" factor from indicia 42a with a "K" factor from indicia 40 along the upper edge portion 39a indicates the minimum annealing time in hours from indicia 42b opposite a selected total weight value from indicia 41 along the lower edge portion 39b.

The annealing time values derived from the use of scales A through D (with the optional substitution in some cases of scale F for scales B and C) suffices for most operations. However, if an even more thorough consideration of all factors is desired, the annealing period of time as obtained from scale C can be adjusted to reflect the performance of a furnace with respect to a norm. Here and in the claims the term "furnace performance" is taken to include an altered performance of the furnace itself with respect to an annealing operation due to age, efficiency design or any other modifying characteristic which alters its performance; and to include any deviation from a normal annealing run due to the type of metal of the coils. The furnace performance may be expressed in terms of percentage, 100 percent being taken as the operating norm for which no adjustment need be made of the end result provided by the use of scales A through D. Values above 100 percent increase the annealing period, while values below 100 percent decrease it.

Figure 6:
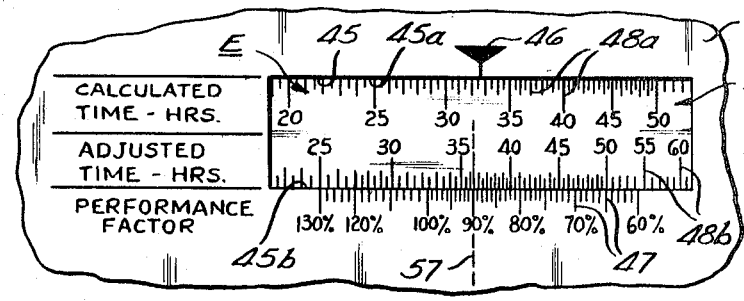

When an adjustment of an annealing period is warranted, it may be arrived at by the use of a scale like scale E (FIGS. 1 and 6). The window opening 45 of this scale has spaced-apart edge portions 45a and 45b, the upper of which has fixed pointing means in the form of an arrowhead 46, and the lower of which has indicia 47 of performance factors expressed in percentage. Slide section 48 of slide panel P has spaced-apart line portions of indicia 48a and 48b relatively movable along the opposed edge portions 45a and 45b for selected registry therewith. The indicia of the upper line portion 48a have time values expressed in hours, representing the time values obtained from indicia 42b of scale D, and cooperate with the arrowhead 46. The indicia of the lower line portion 48b have adjusted time values expressed in hours and cooperate with the indicia 47 of the edge portion 45b.

On scale E, the time value indicia 48a and the adjusted time value indicia 48b have their values increasing in magnitude in the same direction, namely, to the right as viewed in FIG. 6. The percentage indicia 47 decrease in magnitude in the same direction. The units of indicia 47, indicia 48a, and indicia 48b all decrease in linear spacing in the direction of increasing magnitude, based on prior operating experience.

In this manner, registry of an annealing time as derived from scale D on indicia 48a opposite the arrowhead 46 indicates an adjusted annealing time value from indicia 48b opposite a selected furnace performance factor from indicia 47.

WORKING EXAMPLE

The following disclosure describes one type of annealing furnace for which the present calculator is adapted and provides a typical determination of the minimum satisfactory time for the annealing of a particular furnace charge.

The calculator is especially suited for the type of annealing furnace illustrated in FIG. 1 of the parent applications, Ser. No. 764,192 and Ser. No. 9896. However, adjustments may be made to reflect other types of furnace structures or types of material constituting the charge.

In general, the calculator is designed for use with a typical bell-type furnace for annealing coils of strip metal. In such a furnace, an open-bottomed bell is adapted to be positioned over a charge of coils on a furnace base. The bell carries heating means, such as a series of combustion heating tubes disposed about its inner wall. A charge support and diffuser unit is supported on the furnace base within the bell and carries the charge which may comprise a coil or group of coils. An open-bottomed inner cover of relatively thin sheet metal fits around the coils and between them and the furnace bell. The support and diffuser unit has a fan which circulates the heating medium, commonly a protective atmosphere, within the inner cover and about the coils.

For a typical run in a furnace of the type described, assume three coils having these data:

| Coil | Width in Inches | Weight in Pounds | K Factor (from Scale A) |
|---|---|---|---|
| 1 | 25 | 20,000 | 0.392 |
| 2 | 50 | 30,000 | 0.580 |
| 3 | 48 | 50,000 | 0.675 |

Assume further that the annealing temperature sought for the coil center-centers is 1,260° F. while the temperature of the heating medium is to be controlled at 1,360° F.

To determine a "K" or size factor from scale A for coil 3, for example, slide section 20 is moved relatively to the body member M to place "48" from indicia 20a opposite the arrowhead 17 as shown in FIG. 2. Since coil 3 weighs 50,000 pounds, "50" along the edge portion 12b from indicia 18 is matched with the indicia 20b of the lower line portion of slide section 20. This results in a "K" factor of 0.675 as shown by the dotted line 51 (FIG. 2). The "K" factors of 0.392 and 0.0580 for coils 1 and 2, respectively, are derived in a similar manner. However, since the "K" factor for coil 3 is the largest, indicating that this coil is the most difficult to anneal of the three coils in question, it is controlling and therefore is employed in further use of the calculator.

Since, in the data assumed, a temperature differential exists between the desired annealing temperature for the coils and the temperature of the heating medium, scale B is next used to determine a differential "T" value. In this case, referring to FIG. 3, slide section 25 is moved relatively to the body member M to place the temperature of 1,260° F. from indicia 25a opposite the arrowhead 23. Since the gas stream temperature is 1,360° F., this temperature value is read from indicia 24 along edge portion 13b and matched with indicia 25b from the lower line portion of slide section 25. This results in a "T" value of 100 as shown by the dotted line 52 (FIG. 3).

Knowing the "T" value, it is now possible to determine the weight or "W" factor by scale C of the calculator. To do this, slide section 30 is moved relatively to the body member M (FIG. 4) to place "50" from indicia 30a opposite the arrowhead 28, since the total weight of all three coils is 100,000 pounds or 50 tons. The "T" value having been determined to be 100, this value is then noted on the indicia 29 along the edge portion 14b and matched with the indicia 30b from the lower line portion of the slide section 30. This results in a "W" factor of 0.966 as shown by the dotted line 53 in FIG. 4.

Figure 3:
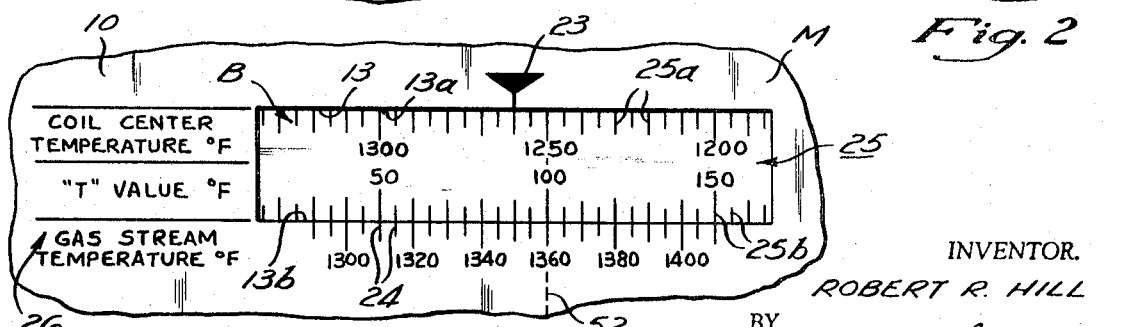

It is pointed out here that a scale like scale F of FIG. 7 could be used in lieu of scales B and C of FIGS. 3 and 4, respectively, if the difference between the annealing g temperature of the coils and the gas stream temperature is already known. This differential value may be known beforehand based, for example, on the experience that the gas stream temperature normally has a relatively fixed value of about 100° F. above the annealing temperature of the metal for a particular series of annealing runs that are contemplated. Or, when the temperature differential is relatively small, an arbitrary value can be assumed. In such cases, the temperature differential is added to the annealing temperature and the result used as the gas stream temperature in scale F of FIG. 7.

For example, referring to the same values previously assumed in the working example, and knowing that for an annealing temperature of 1,260° F. a differential temperature of 100° F. will exist, the additive result indicates that the gas stream temperature will be 1,360° F. Slide section 36 of FIG. 7 is moved relatively to the body member M to place the total weight of the charge in tons, "50," from indicia 36a opposite the arrowhead 34. The gas stream temperature of 1,360° F. is then read from indicia 35 along the lower edge portion 33b and matched with indicia 36b from the lower line portion of the slide member 36. This results in the same "W" factor of 0.966 as before as shown by the dotted line 54.

Knowing now both the "K" and "W" factors and the total weight of the charge, scale D of FIG. 5 provides the value ultimately sought, i.e., the minimum length of time required for the annealing operation. For example, slide section 42 is moved relatively to the body member M to place the "W" factor of 0.966 from indicia 42a opposite the "K" factor of 0.675 on the indicia 40 of the upper edge portion 39a. This registry is indicated by the dotted line 55. Since the total weight of the charge in tons is "50," this value is read from the indicia 41 along the lower edge portion 39b and matched with the indicia 42b of the lower line portion of the slide section 42. This results in an annealing time of 32.6 hours as shown by the dotted line 56.

When the furnace to be used is equivalent to a furnace on which the data for the calculator was originally derived, or is substantially so, the result of scale D can be used directly. If, however, the performance of the furnace in use varies appreciably therefrom, the time period derived from scale D can be adjusted by the use of scale E of FIG. 6. For instance, assuming a performance value of 90 percent, that is, a furnace nine-tenths as efficient as the furnace from which the data were taken in setting up scales A–D, scale E is a convenient means of adjusting the results of the time determination to conditions different from those on which the other scales are based. In particular, slide section 48 is moved relatively to the body member M to place the time derived from indicia 48a of scale D, 32.6 hours, opposite the arrowhead 46. The performance value of 90 percent is next read from the indicia 47 along the lower edge portion 45b and matched with indicia 48b of the lower line portion of the slide section 48. This results in an adjusted time of 36.2 hours as shown by the dotted line 57. The furnace is, accordingly, operated for 36.2 hours properly to anneal all three coils.

Figure 8:
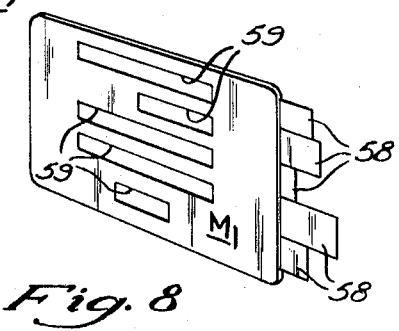
FIG. 8 is an isometric view of a calculator, similar to that of FIG. 1, in which separate slides are individually used for each of the several scales.

Various modifications are possible with the present invention. Although units of the English system are shown in the drawings, other systems such as the metric system may be used. Instead of a unitary slide member P of FIG. 1, multiple slide members may be used as shown in FIG. 8. In this embodiment, there is a slide 58 for each opening 59 in a body member $M_1$. Each slide 58 and opening 59 may have indicia as described for scales A through F. Each slide 58 is individually movable with respect to its opening 59.

If desired, all the scales of the calculator need not be on side 10 of the body member M. Instead, both sides of the sleeve forming the member M may have elongated slots or openings In such a case the slide panel P is designed to have its cooperating scales on both of its sides as well, the slide member scales registering with and being movable relatively to the cooperating scales of the openings of both sides of the body member M. In this embodiment, the slide member may be either unitary as in FIG. 1, or composed of a number of individually movable slides as in FIG. 8.

The present calculator enables an operator to obtain increased production from an annealing furnace as compared with conventional annealing time determinations. It also lends itself to more efficient utilization of annealing furnaces by classifying coils before they are loaded into a furnace. Coils which differ in size and/or weight, but which have the same or substantially the same size ("K") factors, require substantially the same annealing time. Such coils can be loaded as part of the same charge in a furnace, thereby eliminating the necessity for overannealing some coils in order properly to anneal the coil most difficult to anneal of the charge. Moreover, when it is necessary to anneal in one charge coils having substantially different individual annealing time requirements, the furnace can be operated in accordance with the present calculator so as to reduce to a minimum the unavoidable overannealing of some coils and the resulting additional consumption of fuel and loss of production time of the furnace.

While the foregoing describes several embodiments of the present invention, it is understood that modifications and variations may be made within the scope of the following claims.

What is claimed is:

1. A calculator comprising a plurality of interrelated scales cooperating to determine the length of time to operate an annealing furnace to anneal a charge of coils of strip metal at a predetermined temperature, wherein at least two of such coils are of different sizes or weights, said calculator including:

a. a body member having a plurality of scales;
b. a slide member having a slide section carried by the body member for relative movement with each of the body member scales;
c. a first scale on the body member having spaced-apart edge portions, one edge portion having fixed pointing means associated therewith, and the other edge portion having indicia of weight values for individual coils of said charge;
d. a first scale on a slide section of the slide member having two spaced-apart line portions relatively movable along the edge portions of said first body member scale for selective registry therewith, one line portion of said first slide section scale having indicia of coil width values and cooperating with that line portion of the first body member scale having section scale having indicia values representing size factors and cooperating with that edge portion of the first body member scale having coil weight values, whereby registry of a selected coil width on said first slide section scale opposite said pointing means on said first body member scale indicates a size factor on said other line portion of said slide section opposite a selected coil weight on said other edge portion of the first body member scale;
e. a second scale on the body member having spaced-apart edge portions, one edge portion having fixed pointing means associated therewith, and the other edge portion having indicia of temperature values representative of the furnace temperatures;
f. a second scale on a slide section of the slide member having spaced-apart line portions relatively movable along the edge portions of said second body member scale for selective registry therewith, one line portion of said second slide section scale having indicia values representative of the total weight of the charge to be annealed and cooperating with that edge portion of the second body member scale having pointing means; the other line portion of said second slide section scale having indicia values representing weight factors and cooperating with that line portion of the second body member scale having temperature values, whereby registry of a selected total charge weight on said second slide section scale opposite said pointing means on said second body member scale indicates a weight factor on said other line portion of said slide section opposite a selected annealing temperature value for such total charge on the other edge portion of said second body member scale;
g. a third scale on the body member having spaced-apart edge portions, one edge portion having indicia values of said size factors, and the other edge portion having indicia of weight values for the total charge; and
h. a third scale on a slide section of the slide member having spaced-apart line portions relatively movable along the edge portions of said third body member scale for selected registry therewith, one line portion of said third slide section scale having indicia values of said weight factors and cooperating with that edge portion of the third body member scale having indicia of values of said size factors, the other line portion of said third slide section scale having indicia of time values and cooperating with that edge portion of the third body member scale having indicia of weight values for the total charge, whereby registry of a selected weight factor on said third slide section scale opposite a selected size factor on said third body member scale indicates an annealing time on said other line portion of said third slide section scale opposite a value on the other edge portion of said third body member scale representing the total weight of said charge.

2. The slide rule of claim 1 wherein said edge portion of the first scale of the body member having weight values, and both said line portions of the first scale of the slide section having coil widths values and size factors, respectively, have such values increasing in magnitude in the same direction with respect to said scales.

3. The slide rule of claim 2 wherein the units of said edge portion of the first scale of the body member having weight values, and the units of said line portion of the first scale of the slide section having size factors are uniformly spaced therealong, and the units of the line portion of the first scale of the slide section having coil width values decrease in linear spacing in the direction of increasing magnitude, said decreasing spacing being based on prior operating, annealing experience with said furnace.

4. The calculator of claim 1 wherein said edge portion of the second scale of the body member having temperature values, and said line portion of the second scale of the slide section having total charge weight values have such values increasing in magnitude in the same direction with respect to said scales, and said line portion of said second scale of the slide section having weight factors decrease in magnitude in the same direction.

5. The calculator of claim 4 wherein the units of said edge portion and of both of said line portions decrease in linear spacing in the direction of increasing magnitudes, said decreasing spacing being based on prior operating, annealing experience with said furnace.

6. The calculator of claim 1 wherein said edge portion of the third scale of the body member having weight values for the total charge, and both said line portions of the third scale of the slide section having weight factor values and time values, respectively, have such values increasing in magnitude in the same direction with respect to said scales, and said edge portion of the third scale of the body member having size factors has values decreasing in magnitude in said same direction.

7. The calculator of claim 6 wherein the units of both of said edge portions of the body member scale and both of said line portions of the slide section scale decrease in linear spacing in the direction of increasing magnitudes, said decreasing spacing being based on prior operating, annealing experience with said furnace.

8. The calculator of claim 1 having temperature value determining scales on the body member and slide member, wherein:
 a. the body member scale has spaced-apart edge portions, one edge portion having fixed pointing means associated therewith, and the other edge portion having indicia of temperature values representative of the temperature of a heating medium circulating in said furnace;
 b. the slide member has a slide section scale of spaced apart line portions relatively movable along the edge portions of the body member scale for selective registry therewith, one line portion having indicia of temperature values representing the maximum center-center temperature of the coils to be attained when the coils are placed in such heating medium and cooperating with that edge portion of the body member scale having the pointing means; the other line portion of the body member scale having the pointing means; the other line portion of the slide section scale having indicia of temperature values representing the differential between the temperature of said heating medium and said maximum center-center temperature of said coils and cooperating with that edge portion of the body member scale having temperature values of said heating medium, whereby registry of a maximum coil temperature on the slide section opposite the pointing means on the body member indicates the temperature differential on the slide section opposite a selected heating medium temperature on said other edge portion of said body member scale; and
 c. wherein the temperature values of said other edge portion of the second body member scale in claim 1 are calibrated in such temperature differentials.

9. The calculator of claim 8 wherein said edge portion of the body member scale having temperature values of the heating medium, and said line portion of the slide section scale having differential temperature values have such values increasing in magnitude in the same direction with respect to said scales, and said line portion of the slide section scale having maximum temperature values to be attained for the coils has values decreasing in magnitude in the same direction.

10. The calculator of claim 9 wherein the units of said edge portion of the body member scale and both of said line portions of the slide section scale are uniformly spaced along said scales.

11. The calculator of claim 1 having furnace performance adjusting scales on the body member and slide member for determining said length of time, wherein:
 a. the body member scale has spaced-apart edge portions, one edge portion having fixed pointing means associated therewith, and the other edge portion having indicia of performance values of said annealing furnace; and
 b. the slide member has a slide section scale of spaced-apart line portions relatively movable along the edge portions of said body member scale for selective registry therewith, one line portion having indicia of values of annealing times, as determined by said third scales of the body member and slide section, and cooperating with that edge portion of the body member scale having pointing means, and the second line portion of the performance adjusting scale of the slide section having indicia of values of adjusted annealing times and cooperating with that edge portion of the performance adjusting scale of the body member scale having values of annealing furnace performance, whereby registry of an annealing time on said line portion of the slide section opposite said pointing means on said edge portion of the body member scale indicates an adjusted annealing time on said other line portion of said slide section scale opposite a selected annealing furnace performance value on the other edge portion of the body member scale.

12. The calculator of claim 11 wherein said other edge portion of the body member has performance values of an annealing furnace expressed in percentage values based on the performance of a known, selected furnace.

13. The calculator of claim 11 wherein both of said line portions of the slide section scale having values of annealing times and adjusted annealing times, respectively, have such values increasing in magnitude in the same direction with respect to said scales, and said edge portion of the body member scale having values of furnace performance has values decreasing in magnitude in the same direction.

14. The calculator of claim 13 wherein the units of said edge portion of the body member scale and both of said line portions of the slide section scale decrease in linear spacing in the direction of increasing magnitudes, said decreasing spacing being based on prior operating, annealing experience with said furnace.

15. The calculator of claim 1 wherein said body member is a sleeve, and said slide member is telescopically mounted within the sleeve for relative longitudinal movement therewith.

16. The calculator of claim 1 wherein said body member has a substantially rectangular opening for each scale, the opposite longer sides of each opening defining the edge portions of a scale, and a cooperating scale of the slide member is movably disposed within each opening.

17. The calculator of claim 1 wherein said values are in the English system.

18. The calculator of claim 1 wherein said values are in the metric system.

19. The calculator of claim 1 wherein said slide member comprises a plurality of individually operated, relatively slidable members each having a slide section cooperating with a scale of the body member.

20. The calculator of claim 1 wherein said slide member comprises a sheet member having a plurality of slide sections, each section cooperating with a scale of the body member.

21. The calculator of claim 1 wherein said body member comprises a sleeve having faces, each face having at least one opening defining a body member scale, and wherein said slide member is mounted for telescopic movement within the sleeve and has a slide defining a slide member scale cooperating with an opening on the faces of said body member.

PO-1050
(5/69)

UNITED STATES PATENT OFFICE
CERTIFICATE OF CORRECTION

Patent No. 3,627,199         Dated December 14, 1971

Inventor(s) Robert R. Hill

It is certified that error appears in the above-identified patent and that said Letters Patent are hereby corrected as shown below:

In Item [73] on the title page relating to the Assignee, line 4, after "Feb. 9, 1970," delete "now abandoned,".

Signed and sealed this 2nd day of May 1972.

(SEAL)
Attest:

EDWARD M. FLETCHER, JR.
Attesting Officer

ROBERT GOTTSCHALK
Commissioner of Patents